H. B. BIGSBY & W. M. LEWIS.
SPRING HUB FOR VEHICLE WHEELS.
APPLICATION FILED JAN. 11, 1912.
1,039,014.
Patented Sept. 17, 1912.
2 SHEETS—SHEET 1.
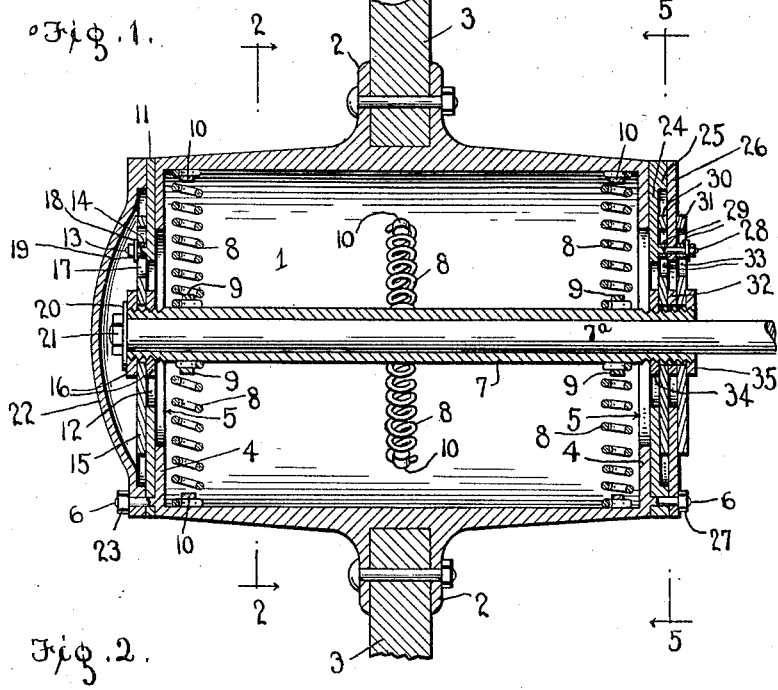
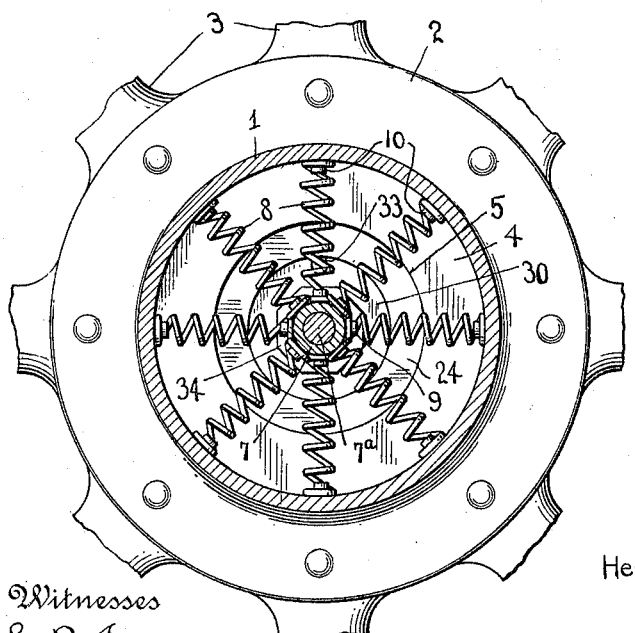
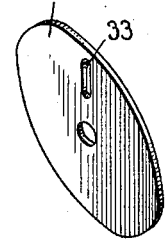
Inventors
Herbert B. Bigsby
William M. Lewis
Witnesses
L. B. James
C. E. Hunt
by H. B. Willson & Co
Attorneys H. B. BIGSBY & W. M. LEWIS.
SPRING HUB FOR VEHICLE WHEELS.
APPLICATION FILED JAN. 11, 1912.
1,039,014.
Patented Sept. 17, 1912.
2 SHEETS—SHEET 2.
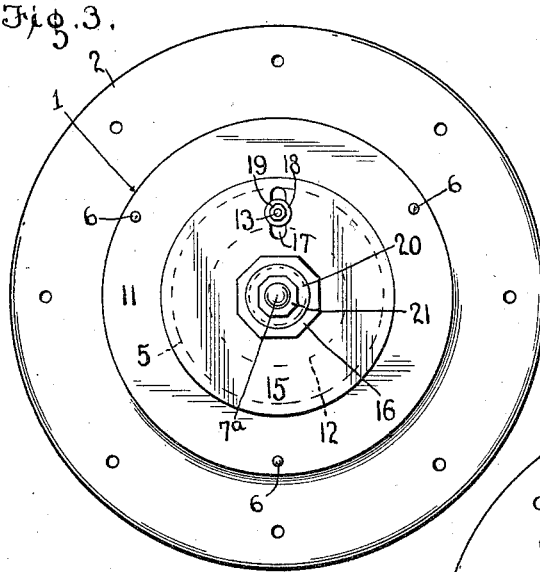
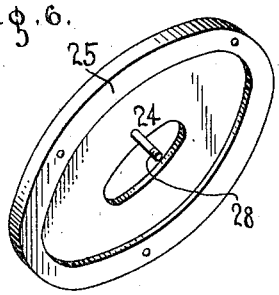
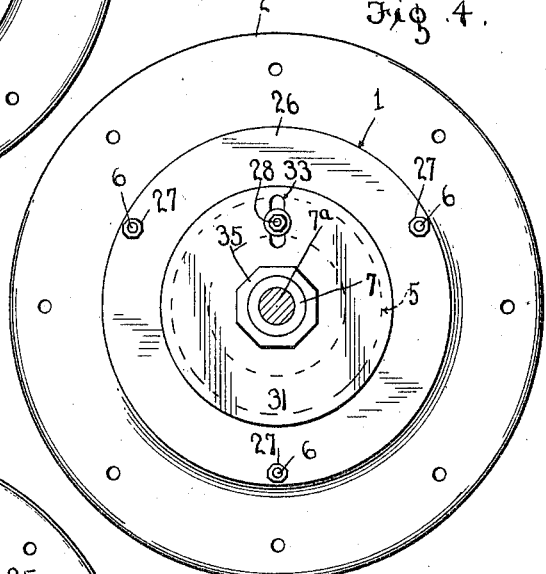
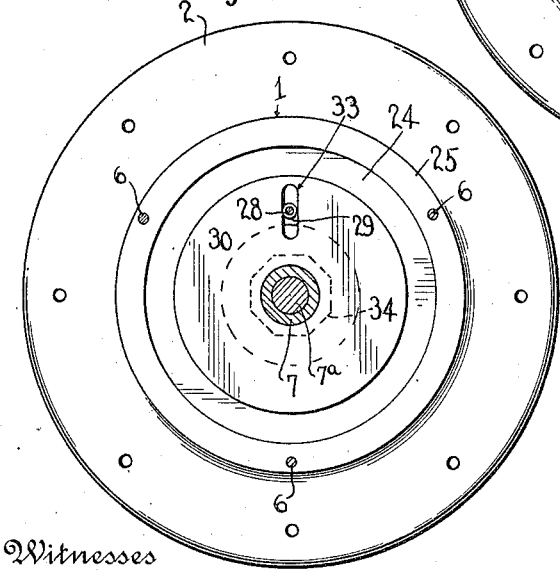
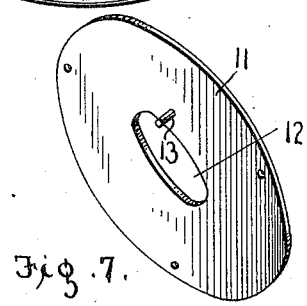
Inventors
Herbert B. Bigsby
William M. Lewis
Witnesses
L. B. James
C. E. Hunt
by H. B. Willson & Co.
Attorneys
COLUMBIA PLANOGRAPH CO., WASHINGTON, D. C.

UNITED STATES PATENT OFFICE.

HERBERT BERTON BIGSBY AND WILLIAM MILO LEWIS, OF NEW HARTFORD, IOWA.

SPRING-HUB FOR VEHICLE-WHEELS.

1,039,014. Specification of Letters Patent. Patented Sept. 17, 1912.

Application filed January 11, 1912. Serial No. 670,639.

*To all whom it may concern:*

Be it known that we, HERBERT BERTON BIGSBY and WILLIAM MILO LEWIS, citizens of the United States, residing at New Hartford, in the county of Butler and State of Iowa, have invented certain new and useful Improvements in Spring-Hubs for Vehicle-Wheels; and we do declare the following to be a full, clear, and exact description of the invention, such as will enable others skilled in the art to which it appertains to make and use the same.

This invention relates to improvements in spring hubs for vehicle wheels.

One object of the invention is to provide a hub of this character having an improved construction and arrangement of springs which act in both directions for yieldingly supporting the load applied to the wheels.

Another object is to provide a hub of this character having an improved means for guiding and holding the same in sliding engagement with the axle box.

With these and other objects in view, the invention consists of certain novel features of construction, and the combination and arrangement of parts as will be more fully described and claimed.

In the accompanying drawings; Figure 1 is a central longitudinal section of our improved hub; Fig. 2 is a cross sectional view thereof on the line 2—2 of Fig. 1; Fig. 3 is a front end view of the hub with the end cap removed; Fig. 4 is a rear end view of the hub with the axle in section; Fig. 5 is a cross sectional view on the line 5—5 of Fig. 1; Fig. 6 is a detail perspective view of the inner end plate for the rear end of the hub; Fig. 7 is a similar view of the front end plate of the hub; Fig. 8 is a similar view of one of the hub guiding plates which are secured to the opposite ends of the box for the purpose of guiding and holding the hub in position thereon.

Our improved hub comprises a hollow body portion or barrel 1 which may be of any suitable shape and which is here shown and is preferably cylindrical. On the outer side of the hub midway between its ends are formed annular radially projecting spoke receiving flanges 2 between which the spokes 3 of the wheel are bolted or otherwise firmly secured. On the inner and outer ends of the hub are formed inwardly extending annular flanges 4, said flanges forming in the opposite ends of the hub, openings 5 through which access may be had to the interior of the body of the hub. On the outer side of the flanges 4 adjacent to the outer sides of the barrel or body of the hub are a series of longitudinally extending stud bolts 6 of which there may be any suitable number, three of said bolts being shown in the present instance. The bolts 6 project a suitable distance beyond the ends of the barrel or body 1 of the hub and the purpose of the same will be hereinafter described.

The hub is provided with a box 7 arranged concentrically therein and which may be keyed to the axle $7^a$ when the wheel is employed as a driver or traction wheel or which may be revolubly mounted on the axle as shown in the present instance. The box 7 is connected with the barrel or body 1 of the hub by series of radially disposed coiled springs 8 of which there may be any suitable number and there may be any suitable number of springs in each series according to the character of the wheel or hub to be supported thereby. The inner ends of the springs 8 are engaged with or secured in apertured studs 9 formed on and projecting radially from the box 7 as shown. The outer ends of the springs 8 are engaged with and secured in apertured studs 10 formed on and projecting inwardly from the inner surface of the barrel or body 1 of the hub as shown. By thus arranging the springs 8 it will be seen that they will exert a yielding resistance in both directions, or in other words the springs below the axle will be compressed while the springs above the axle will be stretched by the load or weight applied to the axle.

In order to guide and hold the hub in position on the box, we provide the barrel or body 1 with a front end plate 11 which is secured to the outer side of the flange on the front end of the body by the bolts 6 which pass therethrough as shown. The end plate 11 is provided with a centrally arranged circular opening 12 through which the end of the box projects. The plate 11 is provided with an outwardly extending guide stud or bolt 13 which projects a suitable distance therethrough and has arranged thereon an anti-friction roller 14. Arranged on the forward end of the box is an annular guide plate 15, said plate being rigidly secured to the end of the box by clamping nuts 16 which are screwed onto the threaded forward end of the box between which the plate 15 is firmly clamped as shown. In the plate 15 is formed a radially disposed guide slot 17 with which the bolt or stud 13 and the roller 14 thereon are engaged. The end of the bolt or stud 13 projects a suitable distance beyond the outer side of the plate 15 and has arranged thereon a washer 18 and nut 19 whereby the plate is held in sliding engagement with the bolt and with the end plate 11 of the hub.

The outer end of the axle 7ª is reduced and threaded and has screwed thereon the usual washer 20 and nut or tap 21, said nut and washer serving to lock the clamping nuts 16 against unscrewing from the box 7. The forward end of the hub is preferably provided with a convexed cap or cover plate 22 which is secured to the outer side of the end plate 11 by the stud bolts 6 which pass therethrough and have screwed on their outer ends clamping nuts 23 as shown. The cap 22 when thus arranged covers and protects the end of the axle and the guiding and holding mechanism of the hub.

On the rear end of the hub is arranged an inner end plate 24 which corresponds to the end plate 11 and has formed thereon an annular outwardly extending spacing flange 25 with which is engaged an outer rear end plate 26, said plate being spaced a suitable distance from the plate 24 by the flange 25 on the latter. The plates 24 and 26 are held in position on the rear end of the hub by the stud bolts 6 projecting from said end, said bolts being provided with clamping nuts 27 as shown. The plates 24 and 26 are provided with centrally disposed openings through which the rear end of the box and the axle project and the end plate 24 is provided at a suitable point with an outwardly projecting guide stud or bolt 28 which passes through the adjacent portion of the outer plate 26 and on said stud or bolt between the plates 24 and 26 and adjacent to the outer side of the latter plate are arranged anti-friction rollers 29.

Arranged on the rear end of the box 7 are two guide plates 30 and 31, said plates being spaced apart by a washer 32. The inner plate 30 when thus arranged has a free sliding movement between the inner and outer end plates 24 and 26, while the outer plate 31 is slidably engaged with the outer side of the end plate 26 as shown. In the plates 30 and 31 are formed radially disposed slots 33 through which the guide stud or bolt 28 extends and with which the anti-friction rollers 29 on said stud engage, said rollers thus preventing the bolt or stud 28 from binding in the slots when the guide plates 30 and 31 move under the weight of the load applied to the axle. The plates 30 and 31 are rigidly secured to the rear end of the box by inner and outer nuts 34 and 35 between which the inner portions of the plates and the washer 32 are clamped.

The studs or bolts 13 and 28 on the front and rear end plates of the hub not only serve as guide plates for holding the hub in position on the box and axle, but also serve as traction connections between the box and the hub when the box is keyed to the axle and the wheel is employed for driving or traction purposes.

By means of a hub constructed as herein shown and described it will be seen that a yielding support is provided for the vehicle to which the wheel and hub is applied and that all shocks and jars occasioned by the passage of the wheels over rough surfaces will be taken up or absorbed, the hub thus serving the purpose or possessing all the advantages of a pneumatic tired wheel without having any of the disadvantages thereof.

From the foregoing description taken in connection with the accompanying drawings, the construction and operation of the invention will be readily undersood without requiring a more extended explanation.

Various changes in the form, proportion and the minor details of construction may be resorted to without departing from the principle or sacrificing any of the advantages of the invention as claimed.

Having thus described our invention, what we claim is;

A hub of the character described comprising a hollow body having on its ends inwardly extending annular flanges, stud bolts arranged on and projecting outwardly from said flanged ends of the hub, a front end plate having therein a central opening and secured to the front end of the hub by said stud bolts, a guide stud arranged on said front end plate and projecting outwardly therefrom, a guide roller on said stud, a box arranged in the hub and having threaded ends projecting through the ends of the body of the hub, a front guide plate, clamping nuts having a threaded engagement with the forward end of the box and adapted to rigidly clamp said front guide plate to said front end of the box, said guide plate having therein a slot adapted to receive the guide stud, and a roller on said front end plate, inner and outer rear end plates spaced apart and secured to the rear end of the hub, said plates having therein centrally disposed openings, a guide stud arranged on the inner end plate and projecting through said outer end plate, anti-friction rollers arranged on said stud on opposite sides of the outer end plate, inner and outer guide plates arranged on the rear end of the box and having a sliding engagement with said inner and outer end plates, said guide plates having therein radially disposed slots adapted to receive said guide stud and rollers, a washer arranged between said guide plates, clamping nuts having a threaded engagement with the rear end of the box and adapted to clamp said guide plates thereto, and series of radially disposed springs arranged between and secured at their opposite ends to said box and the inner side of the body of the hub whereby the box is yieldingly held in position in the hub.

In testimony whereof we have hereunto set our hands in presence of two subscribing witnesses.

HERBERT BERTON BIGSBY.
WILLIAM MILO LEWIS.

Witnesses:
J. O. DOLVIN,
A. A. SIMBRIC.

Copies of this patent may be obtained for five cents each, by addressing the "Commissioner of Patents, Washington, D. C."